US005181595A

United States Patent [19]

Tietze et al.

[11] Patent Number: 5,181,595

[45] Date of Patent: Jan. 26, 1993

[54] ROLLER SUPPORTING ASSEMBLY FOR ESCALATOR OR MOVING WALKWAY HANDRAIL NEWELS

[75] Inventors: Walter Tietze; Hella Badstuebner, both of Stadthagen, Fed. Rep. of Germany

[73] Assignee: Otis Elevator Company, Farmington, Conn.

[21] Appl. No.: 899,194

[22] Filed: Jun. 16, 1992

[51] Int. Cl.[5] ........ B65G 15/00

[52] U.S. Cl. ........ 198/335

[58] Field of Search ........ 198/335, 337, 842

[56] References Cited

U.S. PATENT DOCUMENTS

| | | | |
|---|---|---|---|
| 3,442,367 | 5/1969 | Van Voorhis | 198/335 |
| 3,595,364 | 7/1971 | Schoneweiss | 198/335 |
| 3,989,133 | 11/1976 | Courson et al. | 198/335 |
| 4,273,232 | 6/1981 | Saito et al. | 198/335 |
| 4,449,623 | 5/1984 | Saito et al. | 198/335 |
| 4,488,631 | 12/1984 | Courson | 198/335 |
| 4,627,527 | 12/1986 | Saito | 198/335 |

FOREIGN PATENT DOCUMENTS

| | | | |
|---|---|---|---|
| 0140383 | 10/1979 | Japan | 198/335 |

*Primary Examiner*—D. Glenn Dayoan
*Assistant Examiner*—James R. Bidwell
*Attorney, Agent, or Firm*—William W. Jones

[57] ABSTRACT

An escalator or moving walkway handrail is guided along its path of travel over the curved newels of the escalator or walkway balustrades by a series of guide rollers mounted on a channel member which is fitted onto the balustrade newels. The channel member is generally U-shaped in cross section, and includes a bottom wall from which depend opposed side walls. The side walls are provided with a plurality of spaced slits which impart flexibility to the channel member. Sheet metal formed roller-mounting yokes are spot welded to the outside of the bottom wall, and the handrail guide rollers are mounted in the yokes. The channel member has straps on each end for fastening to handrail guides which lead to and from the balustrade newels. The guide assembly can be preassembled and bent around the newels on site when the escalator or walkway is installed.

6 Claims, 2 Drawing Sheets

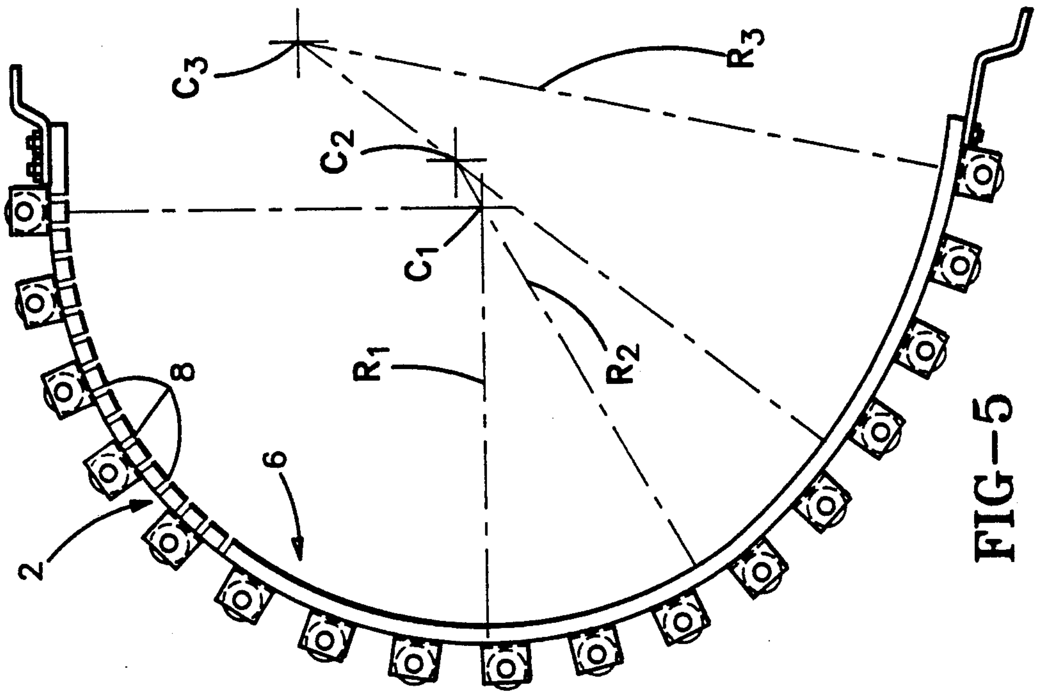
FIG—5
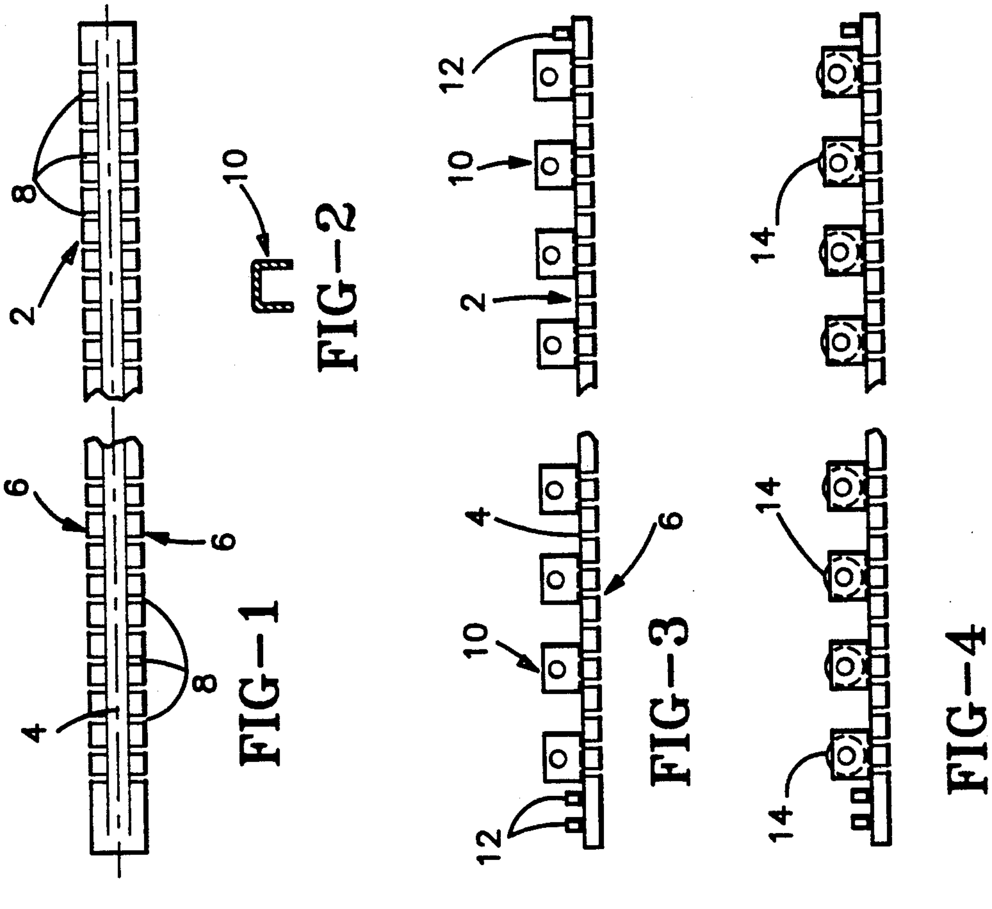
FIG—1
FIG—2
FIG—3
FIG—4

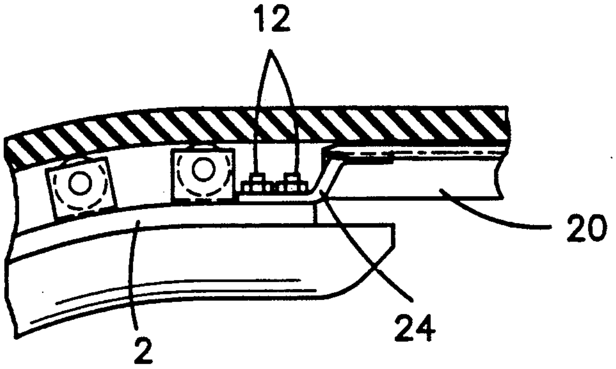
FIG-7
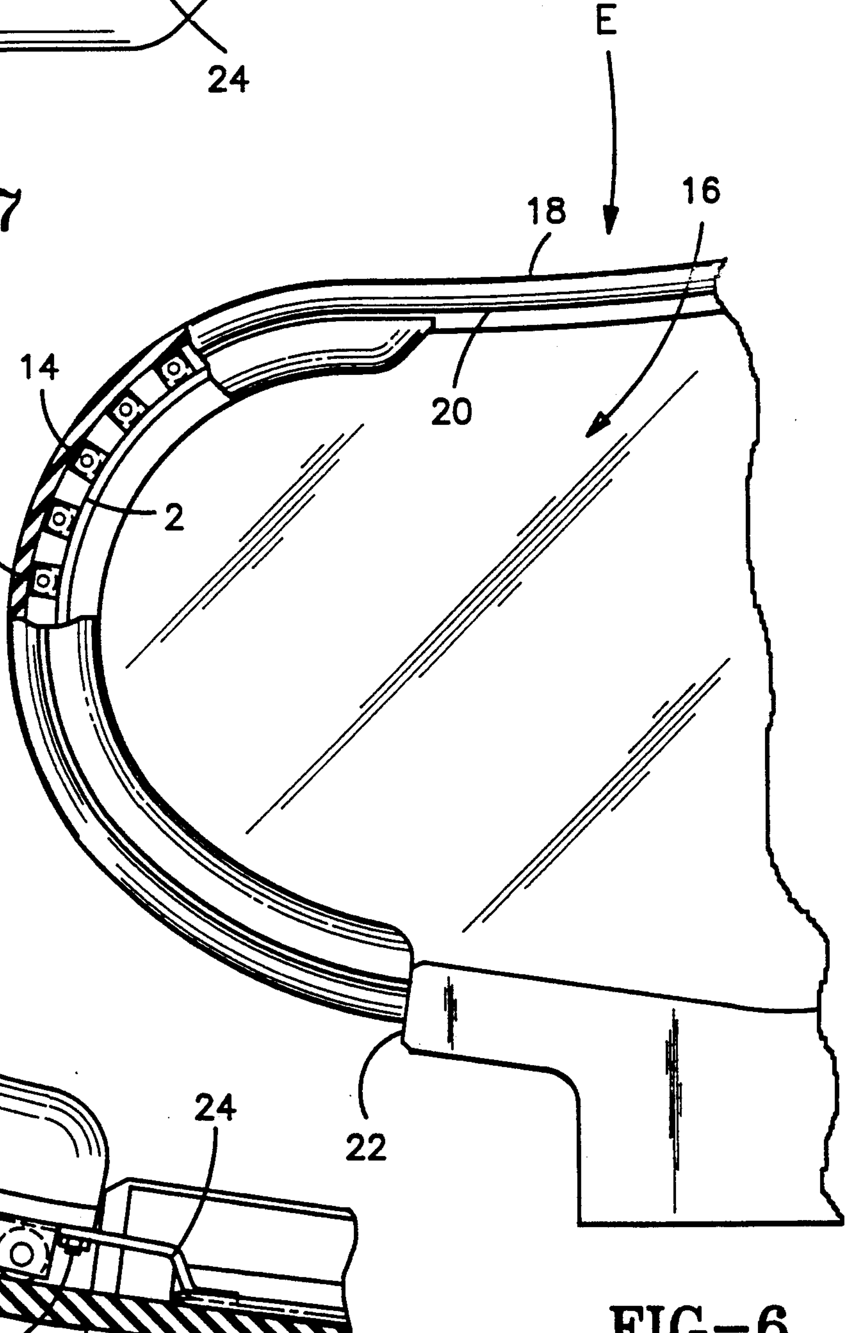
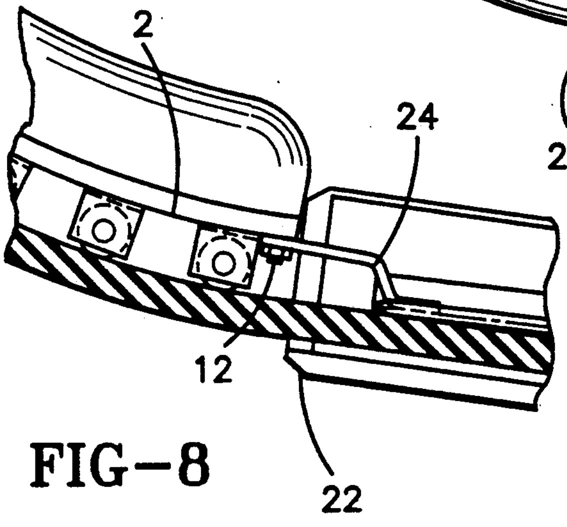
FIG-8
FIG-6

ROLLER SUPPORTING ASSEMBLY FOR ESCALATOR OR MOVING WALKWAY HANDRAIL NEWELS

DESCRIPTION

1. Technical Field

This invention relates to a moving handrail guide assembly for guiding movement of the handrail around the newels on an escalator or moving walkway balustrade. More particularly, this invention relates to a guide assembly which is flexible and can be bent around balustrade newels which have different radii of curvature.

2. Background Art

The moving handrail of an escalator or moving walkway moves over the outer edges of a balustrade or balustrades which flank the passenger treads of the people conveyor. The handrail is pulled along a track which is mounted on the balustrade and which guides the handrail, at least in the exposed portion of its path of travel. The handrail guide track or guide rail may be formed from an extrusion of plastic or metal which has a generally T-shaped cross-sectional configuration; or it may be formed from a bent sheet of steel or the like, which also has a generally T-shaped cross-sectional configuration. Examples of such types of guide rails are found in U.S. Pat. No. 4,836,353 granted Jun. 6, 1989 to W. Adrian, et al; and U.S. Pat. No. 4,488,631 granted Dec. 18, 1984 to I.C. Courson.

The aforesaid guide rails are quite serviceable for most of the path of travel of the handrail, but problems arise in trying to use them on the balustrade newels. The balustrade newels on different types and sizes of passenger conveyors will have different radii of curvature, and the radius of curvature in the balustrade may not be constant from beginning to end in the newels. The extruded and the bent sheet metal guide rails cannot be easily bent so as to conform to the radius of curvature of a balustrade newel. If these types of guide rails are to be used on the balustrade newels, the guide rails must be custom bent and preformed prior to their being taken to the jobsite or factory assembly line and installed on the newels. Thus, the guide systems for handrails on balustrade newels most frequently used in the prior art consist of a series of spaced clamps which are clipped onto the balustrade newel at offset locations therealong, and each of which clamp carries a guide roller journaled in a yoke on the clamp. Using this system, it will be quickly appreciated that each clamp relies on its own integrity to function, and that each assembly will be slightly different from each other one once the clips are installed on the newels.

U.S. Pat. No. 4,273,232 granted Jun. 16, 1981 to C. Saito, et al., addresses the aforesaid problem and notes that one solution would be to mount the roller yokes on an elongated channel member, which has a U-shaped cross-sectional configuration. Saito, et al., teaches that undesirable wrinkles will form in the sides of U-shaped channel members when the latter are bent to conform to the radius of the balustrade newels, and Saito, et al. proposes a more complex channel configuration in order to avoid formation of the wrinkles upon bending of the channel member. Saito, et al., thus proposes one solution to the problem of how to use a formed sheet steel channel member as a base for the handrail guide system on a balustrade newel. The Saito, et al., solution, however, requires the formation of a relatively complex channel member cross-sectional configuration, and requires the use of an excessive amount of the sheet steel.

DISCLOSURE OF THE INVENTION

This invention relates to a channel member which can be fitted onto the balustrade newels of an escalator or moving walkway to cover the entire newel and to serve as a mount for handrail-guiding rollers. The channel member of this invention is formed from a flat strip of sheet steel which is bent into a U-shaped cross-sectional configuration. The side walls of the bent channel are provided with a series of slots which impart an increase in the bendability of the channel so that it can be bent around newels of different radii, or of compound radii. The slots are preferably formed in the sides of the flat strip before it is bent into the U-shape. A plurality of roller yokes are spot welded into the medial part of the strip at equally spaced apart locations along the axis of the strip. Rollers or roller bearings are then fitted into the yokes. The ends of the strip are provided with anchoring bolts to which connecting straps are secured. The straps tie the ends of the channel to the remainder of the handrail guiding system. The assembly will be taken to the jobsite or to the factory assembly area site in its unbent condition, and will be custom fitted onto the balustrade newels at the site by bending the channel about the newels and forcing the slotted sides of the channel over the edges of the glass balustrade. The slots in the channel sides make the channel easier to bend, and also make it easier to snugly fit the channel onto the glass balustrade. The end straps are then secured in place to firmly attach the channel to the remainder of the handrail guide system.

It is therefore an object of this invention to provide an improved balustrade newel guide assembly for a moving handrail on an escalator or moving walkway.

It is a further object of this invention to provide a guide assembly of the character described which extends in one piece from one end of the newel to the other.

It is an additional object of this invention to provide a guide assembly of the character described which can be mounted on different size newels at the jobsite.

These and other objects and advantages of the invention will become more readily apparent from the following detailed description of a preferred embodiment of the invention when taken in conjunction with the accompanying drawings, in which:

BRIEF DESCRIPTION OF THE DRAWINGS

FIG. 1 is a plan view of the flat steel strip from which the guide channel is formed;

FIG. 2 is a cross-sectional view of a roller yoke used in the guide assembly of this invention;

FIG. 3 is a side elevational view of the formed channel with the yokes affixed in place thereon;

FIG. 4 is a view similar to FIG. 3 but showing the rollers journaled in place on the yokes;

FIG. 5 is a side elevational view of the guide assembly showing how it can be bent to assume a compound curvilinear configuration of the type typically found in an escalator or moving walkway newel;

FIG. 6 is a fragmented side elevational view of the guide assembly shown mounted on an escalator balustrade newel; and FIGS. 7 and 8 are enlarged fragmented side elevational views detailing the operation of the end straps on the guide assembly.

BEST MODE FOR CARRYING OUT THE INVENTION

Referring now to the drawings, FIG. 1 shows in plan view the elongated steel strip 2 from which the channel member is formed. The strip 2 has a medial continuous surface 4 and sides 6 which are provided with a series of spaced apart slots 8. FIG. 1 shows the starting piece for the guide assembly after it has been cut to size and slotted. A roller-mounting yoke 10 is shown in FIG. 2. As noted in FIG. 3, the sides 6 of the strip 2 are bent at right angles to the medial surface 4 to provide the channel shape to the member, and a plurality of the yokes 10 are spot welded in spaced-apart locations to the medial surface 4 of the now channel-shaped strip 2. Threaded studs 12 are welded to opposite ends of the medial surface 4 of the channel member 2. The final step in fabricating the guide prior to transfer to the jobsite or assembly area is to mount roller bearings 14 in each of the yokes 10, as shown in FIG. 4.

As shown in FIG. 5, the channel member 2 can be made to conform to a curvilinear path which is defined by a number of different radii $R_1$, $R_2$ and $R_3$ emanating from different centers $C_1$, $C_2$ and $C_3$, respectively. The improved flexibility of the member 2 is due to the slots 8 formed in the sides 6 of the member 2. While providing the desirable degree of flexibility, the slots 8 do not adversely affect the ability of the channel 2 to tightly grip the glass balustrade. In fact, the slots 8 can be viewed as converting the sides 6 into a series of interconnected spring clamps which simplify mounting of the channel 2 on the balustrade, while at the same time providing a firm securement between the channel 2 and the balustrade.

FIGS. 6–8 show the handrail support mounted on an escalator E. The balustrade is denoted by the numeral 16 and the handrail by the numeral 18. The channel 2 is fitted onto the edge of the balustrade 16 which defines the newel area of the escalator E. It will be noted that the handrail 18 moves smoothly over the rollers 14 as it traverses the newel. The upper end of the channel 2 is secured to the handrail track 20 which is mounted on the upper edge of the balustrade 16, and the lower end of the channel 2 is secured to the handrail return guides in the interior of the handrail reentry guard 22. FIGS. 7 and 8 show the straps 24 that anchor each end of the channel 2 via the bolts 12. The distal end of each strap 24 is welded or otherwise secured to the handrail guide tracks.

It will be appreciated that the newel guide assembly will be completely formed and assembled at the factory and will be delivered to the jobsite in the flat form shown in FIG. 4. The assembly will then be custom fitted onto the balustrade newels by hand, if assembly is made in the field. In the event that the escalator is assembled in the factory, the completed assembly will be fitted onto the balustrade newels on the assembly line. The securement of the guide assembly to the balustrade newels is easily performed and a substantially perfect compliance of the assembly to the curve of the newel will be achieved consistently.

Since many changes and variations of the disclosed embodiment of the invention may be made without departing from the inventive concept, it is not intended to limit the invention otherwise than as required by the appended claims.

What is claimed is:

1. A guide assembly for guiding movement of a handrail over a newel portion of an escalator or moving walkway, said assembly comprising:
   a) an elongated metal channel member having a generally U-shaped cross-sectional configuration with a medial wall portion and opposed side walls depending substantially at right angles from opposite edges of said medial wall portion, said side walls each being provided with a plurality of slots therein extending from free edges of said side walls toward said medial wall portion, said slots being operable to increase the bendability of said channel member;
   b) a plurality of handrail-contacting and guiding components secured to said medial wall portion at spaced-apart locations therealong for contacting and guiding movement of the handrail through the newel portion; and
   c) said channel member side walls being spaced apart a distance substantially equal to the thickness of a balustrade component of the escalator or moving walkway whereby the channel member can be easily forced into clamping engagement with the balustrade at the newel portion-defining edge thereof.

2. The guide assembly of claim 1 further comprising securement means at opposite ends of said channel member for tying said channel member into upper and lower handrail guide assemblies on the escalator or moving walkway.

3. The guide assembly of claim 1 wherein said contacting and guiding components comprise yokes, and rollers journaled in said yokes, said yokes being spot welded to said medial wall portion of said channel member.

4. In combination with an escalator or moving walkway assembly comprising a balustrade having a newel portion, and a moving handrail which moves along guides mounted on an edge of said balustrade, a handrail guide assembly for guiding movement of said handrail over said balustrade newel, said guide assembly comprising:
   a) an elongated steel channel member having a medial wall portion and opposed side walls depending at substantially right angles from opposite edges of said medial wall portion, said side walls being subdivided into a series of spaced apart clamps which clampingly fit over said balustrade, with the spacing between adjacent clamps imparting to said channel member sufficient flexibility to enable said channel member to be bent so as to follow newel curves on said balustrade newel; and
   b) a plurality of handrail-contacting guides secured to said medial wall portion at spaced-apart locations therealong for contacting and guiding movement of the handrail through the balustrade newel.

5. The combination of claim 4 further comprising securement means at opposite ends of said channel member for tying said channel member into upper and lower handrail guide assemblies on opposite ends of the balustrade newel.

6. The combination of claim 4 wherein said handrail-contacting guides comprise rollers journaled in yokes, said yokes being spot welded to said medial wall portion of said channel member.

* * * * *